(12) United States Patent
Lingafelt et al.

(10) Patent No.: US 7,475,424 B2
(45) Date of Patent: Jan. 6, 2009

(54) SYSTEM AND METHOD FOR ON-DEMAND DYNAMIC CONTROL OF SECURITY POLICIES/RULES BY A CLIENT COMPUTING DEVICE

(75) Inventors: Charles Steven Lingafelt, Durham, NC (US); Phuong Thanh Nguyen, Cary, NC (US); Chien D. Vu, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 728 days.

(21) Appl. No.: 10/933,624

(22) Filed: Sep. 2, 2004

(65) Prior Publication Data

US 2006/0048218 A1    Mar. 2, 2006

(51) Int. Cl.
G06F 9/00 (2006.01)
G06F 15/16 (2006.01)
G06F 17/00 (2006.01)

(52) U.S. Cl. .............................. 726/13; 726/1; 726/11
(58) Field of Classification Search .................. 726/11, 726/13, 1
See application file for complete search history.

(56) References Cited

U.S. PATENT DOCUMENTS

| | | | | |
|---|---|---|---|---|
| 6,009,475 | A | 12/1999 | Shrader | 709/249 |
| 6,098,172 | A * | 8/2000 | Coss et al. | 726/11 |
| 6,154,775 | A * | 11/2000 | Coss et al. | 709/225 |
| 6,170,012 | B1 | 1/2001 | Coss et al. | 709/229 |
| 6,327,618 | B1 * | 12/2001 | Ahlstrom et al. | 709/223 |
| 7,178,164 | B1 * | 2/2007 | Bonnes | 726/2 |
| 2001/0023486 | A1* | 9/2001 | Kayashima et al. | 713/200 |
| 2001/0025346 | A1* | 9/2001 | Kayashima et al. | 713/200 |
| 2003/0051055 | A1 | 3/2003 | Parrella, Sr. et al. | 709/246 |
| 2003/0051165 | A1 | 3/2003 | Krishnan et al. | 713/201 |
| 2003/0119531 | A1 | 6/2003 | Patton et al. | 455/461 |
| 2003/0135611 | A1 | 7/2003 | Kemp et al. | 709/224 |
| 2003/0158960 | A1 | 8/2003 | Engberg | 709/237 |
| 2003/0233582 | A1 | 12/2003 | Pemmaraju | 713/201 |
| 2004/0123150 | A1* | 6/2004 | Wright et al. | 713/201 |
| 2004/0123153 | A1* | 6/2004 | Wright et al. | 713/201 |
| 2004/0172421 | A1* | 9/2004 | Saito et al. | 707/200 |
| 2004/0181689 | A1* | 9/2004 | Kiyoto et al. | 713/201 |

(Continued)

OTHER PUBLICATIONS

IBM Research Disclosure Bulletin 41596, "Policy Based Offensive Content Substitution through Content Modification Proxy", Nov. 1998, p. 1532.

*Primary Examiner*—Nasser G Moazzami
*Assistant Examiner*—David Garcia Cervetti
(74) *Attorney, Agent, or Firm*—Duke W. Yee; John R. Pivnichny; Mari A. Stewart

(57) ABSTRACT

A system and method for an end user to change the operation of a data flow filter mechanism, such as a firewall, that operates to control data flows between a plurality of protected computing devices and one or more non-protected computing devices. With the system and method, an administrator of a sub-network of computing devices may set a client computing device's scope of rules/policies that may be changed by a user of the client computing device, with regard to a data flow filter mechanism. The user of the client computing device, or the client computing device itself, may then log onto the data flow filter mechanism and modify the operation of the data flow filter mechanism within the limits established by the administrator.

7 Claims, 4 Drawing Sheets

U.S. PATENT DOCUMENTS

| | | | |
|---|---|---|---|
| 2004/0249975 A1* | 12/2004 | Tuck et al. | 709/245 |
| 2004/0268150 A1* | 12/2004 | Aaron | 713/201 |
| 2005/0044089 A1* | 2/2005 | Wu et al. | 707/100 |
| 2005/0049993 A1* | 3/2005 | Nori et al. | 707/1 |
| 2005/0050054 A1* | 3/2005 | Clark et al. | 707/100 |
| 2005/0050377 A1* | 3/2005 | Chan et al. | 714/4 |
| 2005/0055578 A1* | 3/2005 | Wright et al. | 713/201 |
| 2005/0102529 A1* | 5/2005 | Buddhikot et al. | 713/200 |
| 2006/0143699 A1* | 6/2006 | Nagata et al. | 726/11 |

* cited by examiner

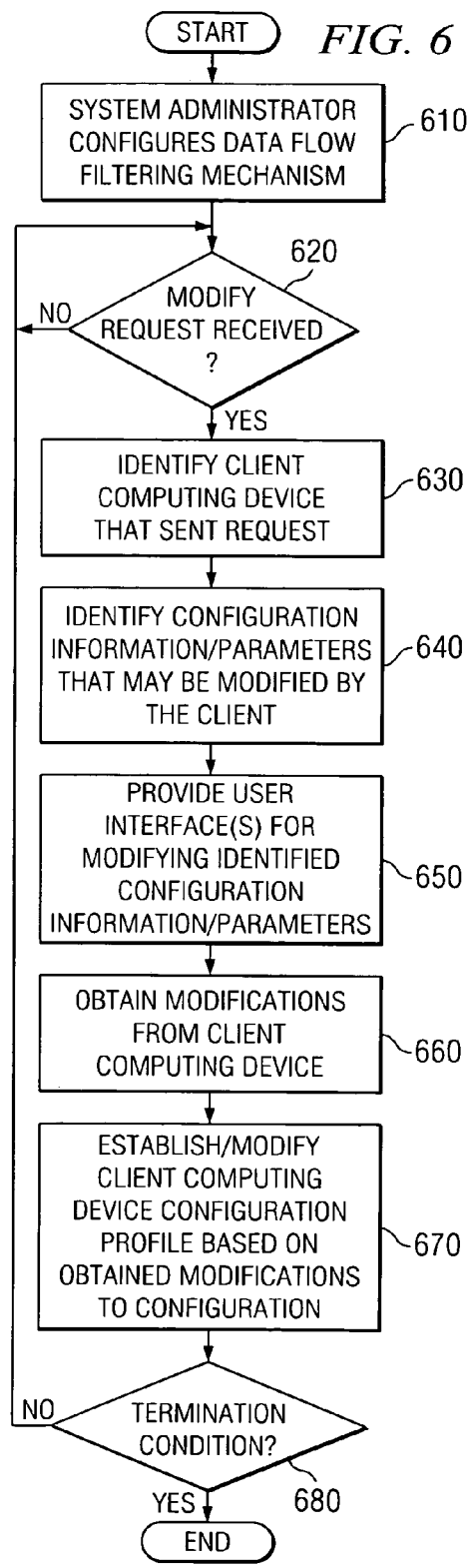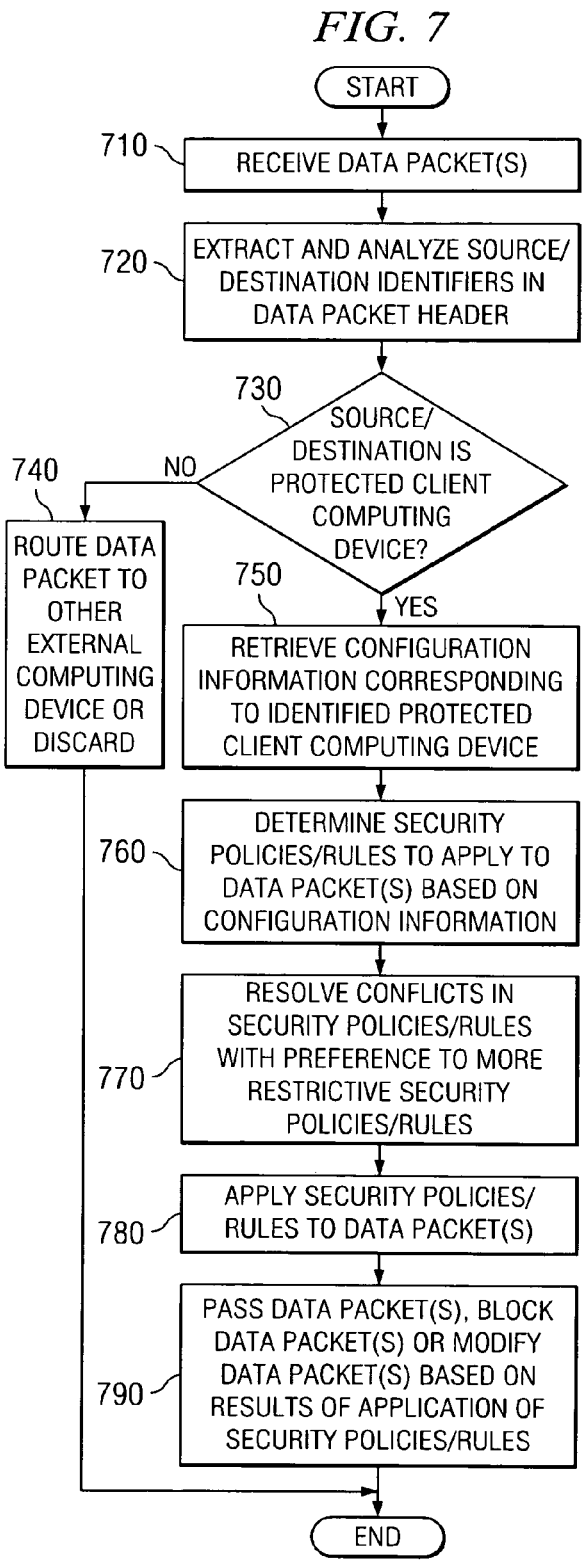

SYSTEM AND METHOD FOR ON-DEMAND DYNAMIC CONTROL OF SECURITY POLICIES/RULES BY A CLIENT COMPUTING DEVICE

BACKGROUND OF THE INVENTION

1. Technical Field

The present invention is generally directed to an improved data processing system and method. More specifically, the present invention is directed to a system and method for providing on-demand dynamic control of security policies/rules by a client computing device.

2. Description of Related Art

With the ever increasing use of computing networks as a way of passing information and performing work, concern about the security of this information and work has also increased. In order to protect computer systems from being accessed outside of an organization by unauthorized individuals, organizations and businesses have implemented firewalls, secured routers, and other security mechanisms to protect their internal computer systems from external access. These firewalls, secured routers, and the like, make use of filters, security rules, security policies, and the like, to govern the way in which they determine which data flows are permitted to pass between internal computing devices, i.e. those protected by the firewall, secured router, etc., and external computing devices.

The firewalls, secured routers, etc., act as filters in a network by preventing certain types of data or data flows from entering or leaving a protected computer system. Typically, a network administration entity, such as a human network administrator, determines, administers and initiates the setting of the security rules and policies which govern the filtering performed by the firewall, secured router, etc. Thus, only a small group of individuals are given the required level of access and permissions to permit them access to the firewall, secured router, etc. Therefore, if an end user, e.g., a user of a client device protected by the firewall at a server to which the client device is coupled, wishes to change the way in which a firewall, secured router, etc. operates, they must obtain the assistance of an administrator to implement the change. This may involve a long process of obtaining authorization for the change, scheduling down time to actually perform the change, and then implementing the change in the operation of the firewall, secured router, etc. There currently is no ability for an end user to change the way in which a firewall, secured router, etc., that governs the data flows from a plurality of protected computer systems, operates.

SUMMARY OF THE INVENTION

The present invention provides a system and method for an end user to change the operation of a data flow filter mechanism, such as a firewall, a router, a switch, a network infrastructure component, a virtual private network node, or the like, that operates to control data flows between a plurality of protected computing devices, e.g., computing devices that are behind the firewall and being protected by the firewall, and one or more non-protected computing devices, e.g., computing devices that are in front of the firewall and are not being protected by the firewall. With the system and method of the present invention, an administrator of a sub-network of computing devices may set a client computing device's scope of rules/policies that may be changed by a user of the client computing device, with regard to a data flow filter mechanism. The user of the client computing device may then log onto the data flow filter mechanism and modify the operation of the data flow filter mechanism within the limits established by the administrator.

In this way, while the data flow filter mechanism operates to filter data flowing between a plurality of protected client computing devices and one or more non-protected client computing devices, an individual protected client computing device may be provided limited access to the data flow filter mechanism to modify the manner by which the data flow filter mechanism operates on data flows to/from that particular protected client computing device. These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 is a flowchart outlining an exemplary operation of the present invention when a protected client computing device modifies the configuration information/parameters for use by the data flow filtering mechanism; and FIG. 7 is a flowchart outlining an exemplary operation of the present invention when the data flow filtering mechanism uses the configuration information/parameters from the data flow filtering mechanism configuration data structures to filter data flows to/from a protected client computing device.

DETAILED DESCRIPTION OF THE PREFERRED EMBODIMENTS

The present invention is directed to a system and method that permits end users of client computing devices to access and modify the operation of a data flow filtering mechanism associated with a sub-network in which their client computing device is a part. The end users are not administrators and are not, in general, provided with authority to modify the operation of the data flow filtering mechanism as a whole. Rather, these end users are given authority, by a system administrator, to change a limited set of security rules/policies associated with the data flow filtering mechanism from their client computing devices. These changes to the security rules/policies only apply to data flows to/from that particular client computing device and do not affect the filtering of data flows to other client computing devices within the sub-network.

Figure 1:
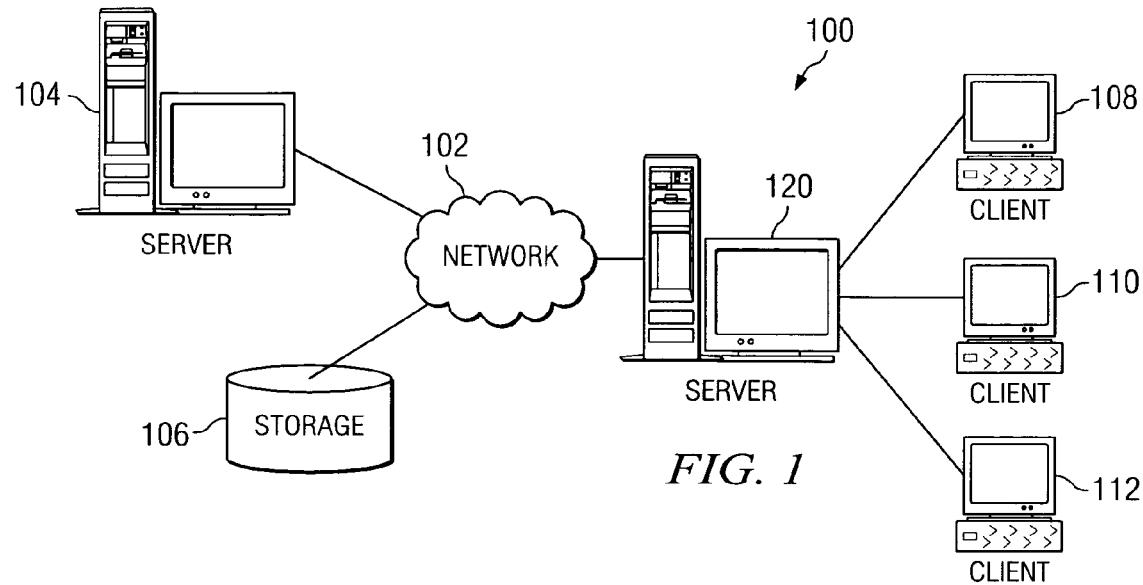
FIG. 1 is an exemplary diagram of a distributed data processing environment in which aspects of the present invention may be implemented.
Figure 2:
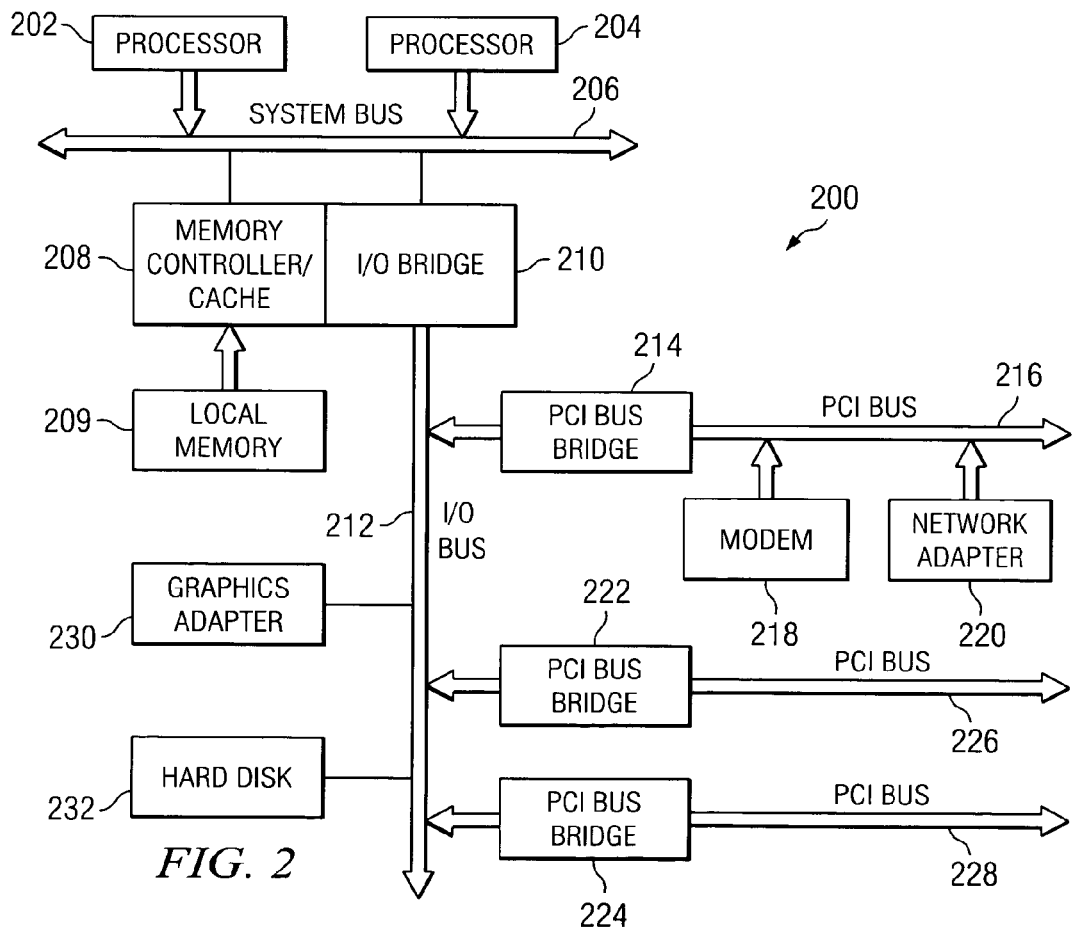
FIG. 2 is an exemplary diagram of a server computing device in which aspects of the present invention may be implemented.
Figure 3:
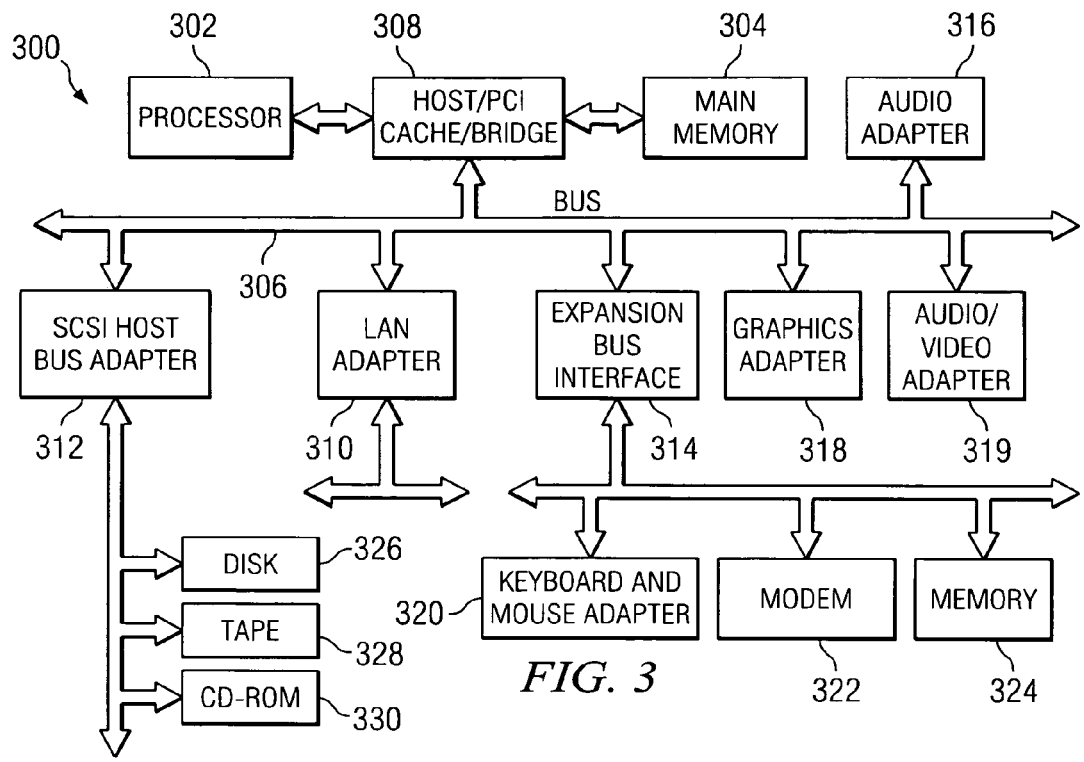
FIG. 3 is an exemplary diagram of a client computing device in which aspects of the present invention may be implemented.

In view of the above summary of the present invention it is clear that the present invention is especially well suited for use in a distributed data processing environment. The following FIGS. 1-3 are provided as exemplary environments and devices in which aspects of the present invention may be implemented. The environments and devices illustrated in FIGS. 1-3 are only exemplary and are not intended to set forth or imply any limitation as to the types of environments or devices in which the present invention may be implemented or with which the present invention may be used.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, servers 104 and 120 are connected to network 102 along with storage unit 106. In addition, clients 108, 110, and 112 are connected to network 102. These clients 108, 110, and 112 may be, for example, personal computers or network computers. In the depicted example, servers 104 and 120 may provide data, such as boot files, operating system images, and applications to clients 108-112. Clients 108, 110, and 112 are clients to servers 104 and 120. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

As depicted in FIG. 1, server 120 is a gateway server through which the clients 108-112 gain access to information and resources available over the network 102. As such, the server 120 includes a data flow filtering mechanism, such as a firewall, secured router, a switch, a network infrastructure component, virtual private network node, or the like, that filters the data flowing through it in accordance with security rules/policies established on the server 120. In this way, the server 120 may protect the clients 108-112 from various security problems arising from different types of data flows. For example, the data flow filtering mechanism 120 may protect the client computing devices 108-112 from malicious attacks, protect personal information from being sent out to unsecured computing devices, protect information and resources of the client computing devices 108-112 from being accessed by unauthorized computing devices, prevent/grant access to content from external computing devices, and the like. Thus, computing devices connected to the server 120 via the network 102 are external computing devices or non-protected computing devices while computing devices 108-112 that must communicate over the network 102 through the server 120 are considered internal or protected computing devices. Such situations arise, for example, with Internet Service Providers (ISPs) and their subscribers, business organizations in which the internal computing devices are part of a local area network (LAN) or intranet that is coupled to the network 102 via established servers, and the like. It is the configuring of the data flow filtering mechanism of the gateway server 120 that is the primary focus of the present invention.

Referring to FIG. 2, a block diagram of a data processing system that may be implemented as a server, such as server 104 or 120 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Referring again to FIG. 1, typically, in order to configure the data flow filtering mechanism, e.g., a firewall, secured router, or the like, on the server 120, a system administrator must be employed to actually log onto the server 120 and, using his elevated level of authority to access the settings of the data flow filtering mechanism, modify the settings of the data flow filtering mechanism to be as desired. These changes will then be applied to all data flows through the data flow filtering mechanism regardless of which client devices 108-112 the data flows originate from or are destined for. Thus, a person with specialized authority must make the changes to the data flow filtering mechanism and the changes are applied to all protected client computing devices.

The present invention provides a mechanism that allows users of protected client computing devices to personally modify operating parameters of the data flow filtering mechanism such that the modifications are applied only to data flows to and from that particular client computing device. The scope of these modifications may be limited by a system administrator such that the types of modifications that may be made by a user of a client computing device are limited to those that will not undermine the security of other protected client computing devices or the protected computing system as a whole. Thus, rather than having to enlist the aid of a system administrator, or other individual with heightened authority to access the data flow filtering mechanism, the present invention permits individual users of protected client computing devices to make their own modifications to the way in which the data flow filtering mechanism operates on data flows to and from their protected client computing device. These modifications will then be applied only to that particular protected client computing device and will not affect the manner by which the data flow filtering mechanism operates on data flows to/from other protected client computing devices.

Figure 4:
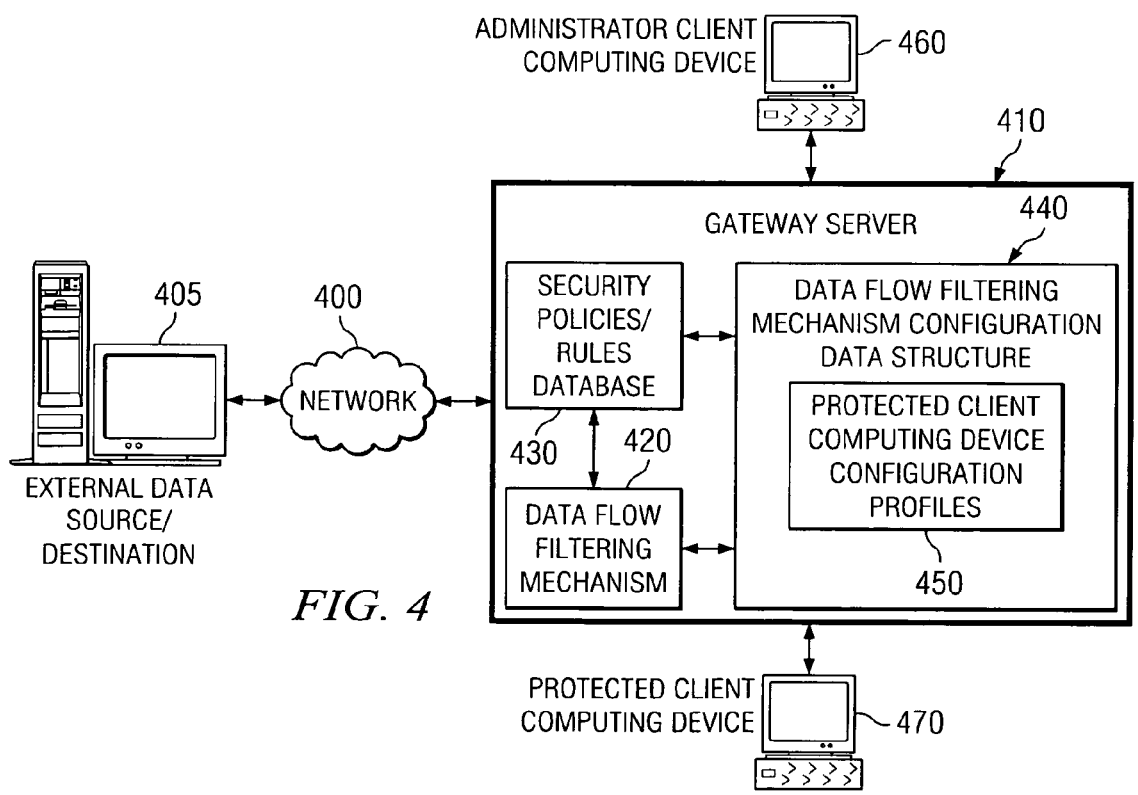
FIG. 4 is an exemplary diagram illustrating an exemplary interaction between the primary operational elements of the present invention when configuring a security filter mechanism in accordance with one exemplary embodiment of the present invention.

FIG. 4 is an exemplary diagram illustrating an exemplary interaction between the primary operational elements of the present invention when configuring a security filter mechanism in accordance with one exemplary embodiment of the present invention. As shown in FIG. 4, the gateway server 410 includes a data flow filtering mechanism 420 which may be, for example, a firewall, a secured router, or the like. The data flow filtering mechanism 420 operates under the control of the security policies/rules in the security policies/rules database 430 to thereby analyze the data flows through the gateway server 410 and determine the types of operations to be performed on these data flows, if any. These security polices/rules may include various rules identifying the types of data flows that are permitted to flow through the gateway server 410 unaltered, the types of data flows that are to be blocked, what types of data are to be removed from the data flow, e.g., images from unsecured sources, types of analysis to be performed, such as virus checking, spam checking, spyware checking, and the like.

The various security policies/rules that are to be used by the data flow filtering mechanism 420 are identified by the data flow filtering mechanism configuration data structures 440. The data flow filtering mechanism configuration data structures 440 store information regarding what security policies/rules are to be used by the data flow filtering mechanism 420 in analyzing the data flowing through the gateway server 410. The data flow filtering mechanism configuration data structures 440 may be modified by a system administrator via the administrator client computing device 460 to thereby change the configuration of the gateway server 410 so that different policies/rules may be utilized by the data flow filtering mechanism 420. For example, the administrator may select various established policies/rules to be utilized by the data flow filtering mechanism 420, establish new policies/rules to be utilized by the data flow filtering mechanism 420, remove policies/rules, and the like.

In addition, the administrator may set in the data flow filtering mechanism configuration data structures 440 which configuration parameters may be modified by users of protected client computing devices 470 without the aid or authorization of the system administrator. That is, for example, the system administrator may set a parameter associated with the various data flow filtering mechanism configuration parameters indicating whether this data flow filtering mechanism configuration parameter is user modifiable or not. If the data flow filtering mechanism configuration parameter is not user modifiable, then a system administrator or other individual with proper authority and access permissions is necessary to modify the configuration parameter. If the data flow filtering mechanism configuration parameter is user modifiable, the user of a protected client computing device may modify the parameter without the need to enlist the help of the system administrator or get authorization from the system administrator before making the modification.

When a user of a protected client computing device 470 wishes to change the manner by which the data flow filtering mechanism 420 operates with regard to data flows to/from the protected client computing device 470, the user may log onto the gateway server 410 and initiate a reconfiguration of the data flow filtering mechanism configuration parameters. The user may then be presented with various interfaces through which those configuration parameters that were determined to be user modifiable by the system administrator are presented to the user so that they may modify the values associated with those configuration parameters. These configuration parameters may identify, for example, the security policies/rules that are to be applied to data flows to/from the protected client computing device 470, parameters to be used with these security policies/rules, and the like. Those configuration parameters that are designated as not being user modifiable are not presented to the user for modification.

The resulting set of user modifiable data flow filtering mechanism configuration parameters may be stored as protected client computing device configuration profiles 450 within the data flow filtering mechanism configuration data structures 440. Thus, each protected client computing device 470 may have its own profile 450 which governs how the data flow filtering mechanism 420 operates with regard to data flows to/from that particular protected client computing device 470.

Thus, the configuration parameters and information in the data flow filtering mechanism configuration data structures 440 that are not determined to be user modifiable, or have not been modified by a user of a protected client computing device 470, are default configuration information and parameters that apply to all data flows to protected client computing devices coupled to the gateway server 410. These are configuration information and parameters are used by the data flow filtering mechanism 420 when not preempted by user modifiable configuration information and parameters in a protected client computing device configuration profile 450. The protected client computing device configuration profiles 450 may be copies of all of the configuration information and parameters with the specific user modifiable parameters and information being modified for that specific protected client computing device or may include only those user modifiable parameters and information that have been set to different values than the default values in the data flow filtering mechanism configuration data structures 440.

In either case, when the gateway server 410 receives data that is to be passed either to a protected client computing device or from a protected client computing device, the data flow filtering mechanism 420 analyzes the data and applies appropriate security policies/rules from the security policies/rules database 430 in accordance with the configuration information and parameters stored in the data flow filtering mechanism configuration data structures 440. As part of this process, the data flow filtering mechanism 420 determines what user modifiable configuration information/parameters to apply to the data and what default configuration information/parameters to apply to the data. This process may involve looking at the data packet headers of the data received in the gateway server 410 to determine if the sender identifier or recipient identifier in the data packet header identifies a protected client computing device. If so, corresponding configuration information/parameters from a protected client computing device configuration profile 450 are used to determine which security policies/rules to apply and the parameters associated with these security policies/rules. In addition, default configuration information/parameters that are not superceded by the protected client computing device configuration profiles 450 may also be applied to the data flowing to/from that particular protected client computing device.

It is important to note that each protected client computing device may have its own configuration profile 450 which governs the manner by which the data flow filtering mechanism 420 operates with regard to data flows to/from that protected client computing device. The configuration information/parameters in one protected client computing device configuration profile 450 does not affect the way in which the data flow filtering mechanism 420 operates with regard to other protected client computing devices. Thus, each individual protected client computing device may have a different set of configuration information/parameters by which the data flow filtering mechanism 420 operates. Only the configuration information and parameters designated as non-user modifiable are applied to all protected client computing devices that are protected by the gateway server 410.

Thus, for example, if data is being transmitted from the external data source/destination 405 to the protected client computing device 470, this data is routed through the network 400 to the gateway server 410. The gateway server 410 receives the data and the data flow filtering mechanism 420 analyzes the data in accordance with the security policies/rules in the security policies/rules database 430 and in accordance with the configuration information/parameters stored in the data flow filtering mechanism configuration data structures 440. As part of this analysis, the data flow filtering mechanism 420 reads information from the data packet headers to identify the source and destination of the data packets. When the data flow filtering mechanism 420 identifies the destination as the protected client computing device 470, the data flow filtering mechanism 420 retrieves the configuration information/parameters for the protected client computing device 470 from the protected client computing device configuration profiles 450. In addition, the data flow filtering mechanism 420 may retrieve the default configuration information/parameters from the data flow filtering mechanisms configuration data structures 440.

The data flow filtering mechanism 420 then applies the security policies/rules in accordance with the default configuration information/parameters so long as there is no configuration information/parameters in the protected client computing device configuration profile 450 that supercedes the default configuration information/parameters. If there is configuration information/parameters in the protected client computing device configuration profile 450 that supercedes the default configuration information/parameters, then the configuration information/parameters in the client computing device configuration profile 450 are used to govern the operation of the data flow filtering mechanism 420 on the data being transmitted from the external data source/destination 405 to the protected client computing device 470. Obviously, this operation may also be applied to data being transmitted from the protected client computing device 470 to the external data source/destination 405 wherein the source identifier in the header of the data packets is used to determine the identity of the protected client computing device 470 and the particular configuration information/parameters to be used by the data flow filtering mechanism 420.

It should be noted that there may be instances where default configuration information/parameters may conflict with configuration information/parameters in a protected client computing device configuration profile. For example, if the default configuration information indicates that data packets from a particular data source are to be blocked and the protected client computing device configuration profile indicates that all data packets are to be permitted to flow through, then a conflict arises. In such instances, the more restrictive security policy/rule may be selected to be used by the data flow filtering mechanism. This will tend to solve most conflicts since if the defaults policies/rules are more restrictive, then it is not intended for the user of a protected client computing device to be able to make these policies/rules less restrictive. However, it will tend to be permissible for the user of a protected client computing device to establish more restrictive security policies/rules than the default policies/rules if he/she so wishes.

While the above embodiments of the present invention are described in terms of a user of a protected client computing device logging onto the gateway server 410 and using one or more interfaces to modify the configuration information/parameters for use with data flows to/from that protected client computing device, the present invention is not limited to such. Rather, this process may be automated such that the protected client computing device 470 may automatically communicate with the gateway server 410 to modify the configuration information/parameters for data flows to/from the protected client computing device 470 when certain conditions are detected. For example, when data flows to the protected client computing device 470 are determined to be indicative of an attack on the protected client computing device 470, the protected client computing device 470 may automatically communicate with the gateway server 410 to adjust the configuration information/parameters being used with data flows to/from the protected client computing device 470 so that appropriate measures are taken to block the attack.

In another exemplary embodiment, the client computing device 470 may change the configuration profile at various times of day, week, month, year, etc. when the change in the way that the data flow filtering mechanism 420 is deemed to be advantageous for a particular purpose. Alternatively, these types of schedules may be created in the protected client computing device configuration profile 450 rather than having the protected client computing device 470 communicate with the gateway server 410 each time a new configuration is to be used.

Figure 5A:
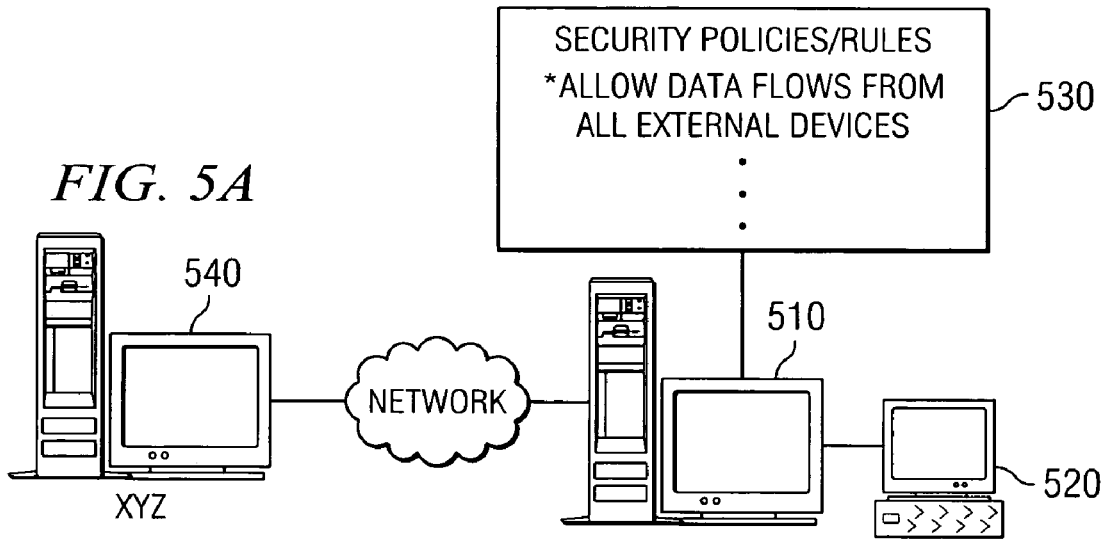
FIGS. 5A and 5B are exemplary diagrams illustrating an example scenario wherein a user of a protected client computing device may modify the security policies/rules applied to data flows to/from the client computing device.
Figure 5B:
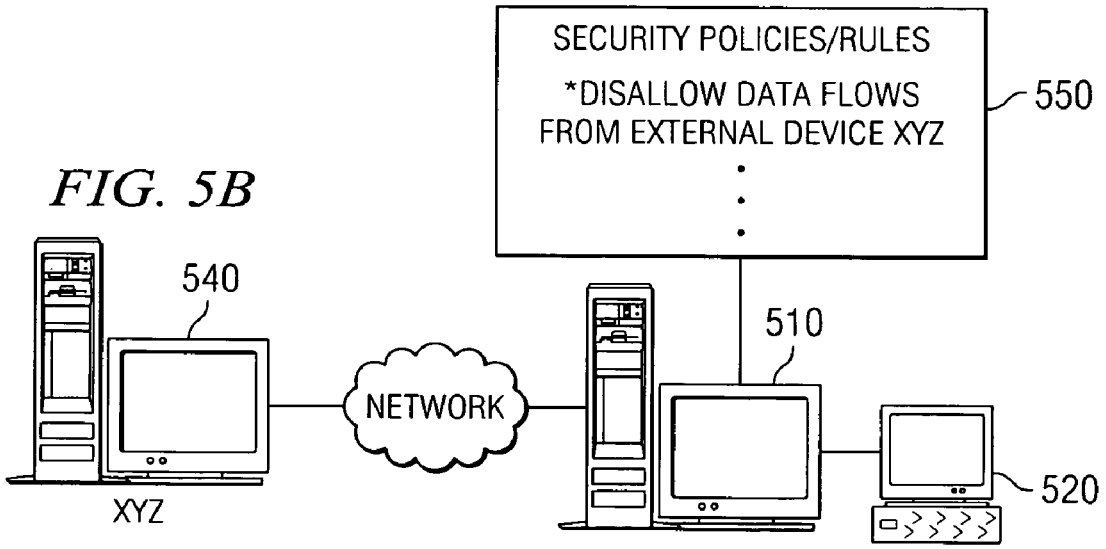

FIGS. 5A and 5B are exemplary diagrams illustrating an example scenario wherein a user of a protected client computing device may modify the security policies/rules applied to data flows to/from the client computing device. FIG. 5A illustrates a setting of a system in which a data flow filter mechanism 510 is configured to use the security policies/rules 530 with data flows to the protected client computing device 520. As shown in FIG. 5, these security policies/rules 530 include a security policy that allows data flows from all external devices. As a result, when a data source 540 initiates an attack on the protected client computing device 520, e.g., a denial of service attack, a SYN flood attach, an ICMP flood attack, or the like, the data packets that are being transmitted by the data source 540 are permitted to flow through the data flow filter mechanism 510.

At some time thereafter, the protected client computing device 520 may detect that the data being received from the data source 540 is an attack and may then initiate a communication with the data flow filtering mechanism 510 to thereby change the set of policies/rules being applied to data flows to/from the protected client computing device 520. The change in the security policies/rules and the affect of this change are illustrated in FIG. 5B.

As shown in FIG. 5B, the security policies/rules 530 have been changed by the protected client computing device 520 so that the new security policies/rules 550 include the policy to disallow data flows from data source 540. As a result, when data from data source 540 is received by the data flow filtering device 510 destined for protected client computing device 520, the data is blocked by the data flow filtering device 510. As a result, the protected client computing device 520 is not subjected to the attack. It should be noted, however, that this change in the security policies/rules applied by the data flow filtering mechanism 510 only applies to the data flows to/from the protected client computing device 520. Other protected client computing devices 520 may still receive data from the data source 540 until they also modify their protected client computing device configuration profiles to block data flowing from data source 540 or until the system administrator modifies the default policies to block data flow from data source 540 (which would be applied to all of the protected client computing devices).

Permitting the user of a protected client computing device, or the protected client computing device itself, to modify the operation of data flow filter mechanism permits a more rapid response to security problems that may arise than known mechanisms. That is, in known mechanisms, a system administrator must be notified of the situation, a request must be submitted to make a change in the way that the data flow filtering mechanism operates, the system administrator must schedule time to make the change, and then must perform the change to the operation of the data flow filtering mechanism. With the present invention, the modification may be made virtually immediately without the intervention of a system administrator. In addition, to reduce the likelihood that one protected client computing device or user of a protected client computing device interferes with the data flows to/from another protected client computing device, these modifications by the protected client computing device are limited to data flows to/from itself rather than applying to all of the protected client computing devices.

FIGS. 6 and 7 are flowcharts outlining exemplary operations according to one exemplary embodiment of the present invention. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

FIG. 6 is a flowchart outlining an exemplary operation of the present invention when a protected client computing device modifies the configuration information/parameters for use by the data flow filtering mechanism. As shown in FIG. 6, the operation starts with a system administrator setting the data flow filtering mechanism configuration information indicating which portions of configuration information/parameters are user modifiable and which portions are not (step 610). Thereafter, a determination is made as to whether a request is received from a client computing device requesting access to modify configuration information and/or parameters (step 620). If not, the operation returns to step 620 waiting for a request to modify configuration information/parameters.

If a request is received that requests modification of configuration information/parameters for the data flow filtering mechanism, the client computing device from which the request is received is identified (step 630). The configuration information/parameters that may be modified by that client computing device are then identified (step 640). As mentioned above, in one embodiment, all of the client computing devices may modify the same sets of configuration information/parameters while in other embodiments, each individual client computing device may be given authority to modify different sets of configuration information/parameters.

User interfaces are then provided to the client computing device for changing the configuration information and/or parameters and/or parameter values for the configuration information/parameters identified as being modifiable by the client computing device (step 650). The modifications to this configuration information/parameters are then obtained from the client computing devices via the user interfaces (step 660). These modifications are then used to establish or modify a client computing device configuration profile for the client computing device (step 670).

A determination is made as to whether a termination condition has occurred (step 680), e.g., a powering down of the system, a reboot of the system, etc. If not, the operation returns to step 620 waiting for another request to modify configuration information/parameters. If a termination condition occurs, the operation ends.

FIG. 7 is a flowchart outlining an exemplary operation of the present invention when the data flow filtering mechanism uses the configuration information/parameters from the data flow filtering mechanism configuration data structures to filter data flows to/from a protected client computing device. As shown in FIG. 7, the operation starts with the receipt of a data packet or group of data packets from either an external computing device or a protected client computing device (step 710). The source and destination device identifiers in the header of the data packet are extracted and analyzed to determine if the data packet is sent from or being transmitted to a protected client computing device (step 720). A determination is made as to whether one of the source and destination device identifiers correspond to a protected client computing device (step 730). If not, the data packet is routed to another external computing device or is discarded (step 740).

If the data packet is being sent to or from a protected client computing device, configuration information corresponding to the identified protected client computing device, for configuring the data flow filtering mechanism, is retrieved (step 750). This configuration information along with the default configuration information for the data flow filtering mechanism are then used to determine what security policies/rules to apply to the data packet and the parameters associated with these security policies/rules (step 760). Any conflicts between the default configuration information and the specific protected client computing device configuration information are resolved in favor of the most restrictive configuration information (step 770). The resulting security policies/rules are then applied to the data packet(s) (step 780). Depending on the result of the application of the security policies/rules the data packet(s) may be permitted to pass through the data flow filtering mechanism, may be blocked by the data flow filtering mechanism, or may be modified by the data flow filtering mechanism, e.g., unsecured images may be removed (step 790). The operation then terminates. This process may be repeated for each data packet or group of data packet(s) received.

Thus, the present invention provides a mechanism for permitting end users or protected client computing devices, who are not system administrators, to modify certain configuration information and/or parameters that govern the operation of a data flow filtering mechanism with regard to data flows to that protected client computing device. The present invention provides a mechanism for establishing various configuration profiles for each protected client computing device so that they may have partially customizable operation of the data flow filtering mechanism. The modifications made to the operation of a data flow filtering mechanism by one protected client computing device are limited to application to data flows to/from that protected client computing device so that these modifications do not affect data flows to other protected client computing devices protected by the data flow filtering mechanism.

While the present invention has been described with reference to filtering data flows that may be indicative of an attack on protective client computing devices, the present invention is not limited to such implementations. Rather, the present invention may be used to filter any data flows between a protected client computing device and external computing devices. For example, the present invention may be used to prevent access to or grant access to questionable subject matter by a user of a protected client computing device.

As an example, the present invention may be implemented in a protected client computing device such as a public library computing device that is connected to the Internet and which uses a web browser. Due to legal, ethical, and/or moral considerations, the security policies/rules may be established so that certain web/chat sites are blocked, i.e. a user of the protected client computing device is not permitted to obtain content from the blocked web/chat sites. The present invention permits the public library to ease these restrictions when the user is authenticated as being an adult and, as a user of the protected client computing device, requests a lifting of the restrictions with regard to certain web/chat web sites. With the present invention, the security policies/rules applied to that user's connection with external computing devices may be dynamically changed by the user so that the web/chat sites are unblocked while other client computing devices are not affected by this change. The network administrator for the public library is not involved in the change of the security policies/rules other than having original defined which security policies/rules may be changeable by the user. Thus, in addition to filtering data flows to block attacks on protected computing devices, the present invention may be used to control the data flows to/from protected computing devices so as to prevent or grant access by the user of the protected computing device to content from external computing devices.

It should be appreciated that the above embodiments are described in terms of the system administrator identifying which configuration information and parameters may be modifiable by users in general. That is, the setting of configuration information/parameters as user modifiable is made applicable to all users of protected client computing devices that are protected by that data flow filtering mechanism. However, the present invention is not limited to such an embodiment. To the contrary, the system administrator may establish user modifiable configuration information/parameters for each user and/or protected client computing device such that not all of the users and/or protected client computing devices may modify the same configuration information/parameters. In this way, varying levels of modifiability may be generated for the various configuration information/parameters. For example, users having a particular level of access may be given a larger set of configuration information/parameters that they may modify than users with lower levels of access.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for configuring a data flow filtering mechanism that filters data flows to a plurality of client computing devices, comprising:
    establishing one or more portions of configuration information for the data flow filtering mechanism that are modifiable by a protected client computing device in a plurality of protected client computing devices and one or more portions of configuration information for the data flow filtering mechanism that are not modifiable by the protected client computing device;
    receiving a request from the protected client computing device to modify a portion of configuration information for the data flow filtering mechanism that is established as a client computing device modifiable portion of configuration information; and
    storing a client computing device configuration profile incorporating the modification to the client computing device modifiable portion of the configuration information, wherein the client computing device configuration profile is used by the data flow filtering mechanism to filter a data flow to or from the protected client computing device, wherein the client computing device configuration profile filters data flowing between the protected client computing device and one or more non-protected client computing devices, and wherein the client computing device configuration profile applies only to data flows to and from the protected client computing device through the data flow filtering mechanism and does not affect data flows to other protected client computing devices in the plurality of protected client computing devices through the data flow filtering mechanism;
    receiving a data flow;
    determining if the data flow is associated with the protected client computing device that is protected by the data flow filtering mechanism;
    filtering the data flow based on the client computing device configuration profile associated with the protected client computing device in response to a determination that the data flow is associated with the protected client computing device;
    determining if there is a conflict between a security policy/rule in the client computing device configuration profile and a security policy/rule in default configuration information; and
    resolving the conflict based on a security policy/rule conflict resolution policy, wherein the security policy/rule conflict resolution policy selects a more restrictive security policy/rule to be used by the data flow filtering mechanism.

2. The method of claim 1, wherein the data flow filtering mechanism is one of a firewall, a router, a switch, a network infrastructure component, and a virtual private network node.

3. The method of claim 1, wherein the portions of configuration information for the data flow filtering mechanism identify security policies or rules to be applied by the data flow filtering mechanism to data flows through the data flow filtering mechanism.

4. The method of claim 3, wherein the security polices or rules identify one or more of data flow types that are permitted to pass through the data flow filtering mechanism unaltered, data flow types that are to be blocked by the data flow filtering mechanism, and types of data that are to be removed from data flows.

5. The method of claim 1, wherein the request to modify a portion of the configuration information is automatically generated by the protected client computing device in response to a detected condition or event.

6. The method of claim 1, further comprising:
    providing one or more interfaces through which a user may select or enter configuration parameters in the client computing device modifiable portion of the configuration information for configuring the data flow filtering mechanism for filtering data flows to and from the protected client computing device.

7. The method of claim 1, wherein determining if the data flow is associated with the protected client computing device includes:
    reading header information in one or more data packets of the data flow;
    determining if one of a source identifier and a destination identifier in the header information identifies the protected client computing device; and
    retrieving the client computing device configuration profile in response to a determination that one of the source identifier and the destination identifier identifies the protected client computing device.

* * * * *